United States Patent [19]

Satomi

[11] Patent Number: 5,651,466
[45] Date of Patent: Jul. 29, 1997

[54] SWIRL TYPE FOREIGN MATERIAL REMOVING MACHINE AND METHOD OF REMOVING FOREIGN MATERIAL BY THE MACHINE

[75] Inventor: Hitoshi Satomi, Shizuoka, Japan

[73] Assignee: Satomi Seisakusho Co., Ltd., Shizuoka, Japan

[21] Appl. No.: 406,417

[22] Filed: Mar. 20, 1995

[30] Foreign Application Priority Data

Nov. 21, 1994 [JP] Japan .................... 6-286375

[51] Int. Cl.$^6$ ................... B04C 5/02; B01D 21/26
[52] U.S. Cl. .................. 209/734; 210/512.1
[58] Field of Search ................ 209/725, 726, 209/727, 734, 717, 718, 719, 724; 210/512.1, 512.2

[56] References Cited

U.S. PATENT DOCUMENTS

| | | | |
|---|---|---|---|
| 2,377,721 | 6/1945 | Scott | 209/734 X |
| 2,849,930 | 9/1958 | Freeman et al. | 209/734 X |
| 3,516,551 | 6/1970 | Wallen et al. | 210/512.1 |
| 4,159,073 | 6/1979 | Liller | 209/734 X |

FOREIGN PATENT DOCUMENTS 1217487  3/1986  U.S.S.R. ................. 209/734

*Primary Examiner*—William E. Terrell
*Assistant Examiner*—Tuan Nguyen
*Attorney, Agent, or Firm*—Kanesaka & Takeuchi

[57] ABSTRACT

A swirl type foreign material removing machine is formed of a casing having an end wall, a smooth side wall connected to the end wall and extending from the end wall, a first outlet formed at a side away from the end wall, an inlet formed in the side wall at a side away from the first outlet, and a second outlet formed in a center of the end wall. A raw material supply path is tangentially connected to the casing through the inlet, and a device for adjusting an opening rate of the inlet is formed in the side wall. An amount of the raw material ejected into the casing is adjusted by the adjusting device, so that the foreign materials are effectively removed from the first outlet.

11 Claims, 6 Drawing Sheets

С,651,466

SWIRL TYPE FOREIGN MATERIAL REMOVING MACHINE AND METHOD OF REMOVING FOREIGN MATERIAL BY THE MACHINE

BACKGROUND OF THE INVENTION AND RELATED ART STATEMENT

The present invention relates to a swirl type foreign material removing machine and a method of removing foreign materials by the machine, wherein foreign materials can be effectively removed from a raw material.

There is a swirl type foreign material removing machine for removing foreign materials from a stock or paper raw material by utilizing a centrifugal force and liquid shearing force. One swirl type foreign material removing machine is formed of a casing in a reversed cone shape, and includes an inlet path for a raw material connected tangentially to an upper outer periphery of the reversed cone shape casing, a first outlet for removing foreign materials at the apex of the reversed cone shape casing, and an outlet path for a refined raw material located in the center of a side wall of the casing at a side opposite to the apex of the casing.

The machine is regulated such that a pressure difference between a pressure in the inlet path and a pressure in the outlet path is constant, such as 1.5 kg/cm$^2$ by opening and closing an inlet valve formed at the inlet path and an outlet valve formed at the outlet path.

However, among the foreign materials contained in the paper raw material, there are materials with heavy specific gravity, such as sand, metal and so on, and materials with light specific gravity, such as wood chips and so on. Also, even if specific gravity is the same, shapes of materials may be different. Thus, in case the pressure difference is controlled to be the same, it is difficult to effectively remove many kinds of foreign materials.

Also, since the inlet valve for adjusting the pressure difference is located away from an opening for the inlet path in the reversed cone casing, the ejecting energy from the opening is consumed by pressure loss and so on from the inlet valve to the opening of the casing. Thus, swirl is not effectively formed in the casing, and large power is required by a pump.

The present invention has been made to obviate the above drawbacks, and to provide a swirl type foreign material removing machine and a method of removing foreign materials by the machine, wherein various foreign materials can be effectively removed.

SUMMARY OF THE INVENTION

In order to accomplish the above object, a swirl type foreign material removing machine of the invention comprises a casing in a reversed cone shape having a first outlet at a top thereof, a raw material supply path formed at a side opposite to the top to be tangentially connected to the casing for supplying a raw material transferred by a pump to the casing through an opening of the casing, opening rate regulating means for adjusting an opening rate of the opening of the casing, and an outlet path having a second outlet formed at a center of a side wall of the casing at a side away from the top.

Also, the swirl type foreign material removing machine of the invention comprises a cylindrical casing having a first outlet at a top or one end thereof, a raw material supply path formed at a side opposite to the top to be tangentially connected to the casing for supplying a raw material transferred by a pump to the casing through an opening of the casing, opening rate regulating means for adjusting an opening rate of the opening of the casing, and an outlet path having a second outlet formed at a center of a side wall of the casing at a side away from the top.

In a method of removing foreign materials by a swirl type foreign material removing machine, the removing machine is formed of a casing in a reversed cone shape having a first outlet at a top thereof, a raw material supply path formed at a side opposite to the top to be tangentially connected to the casing for supplying a raw material transferred by a pump to the casing through an opening of the casing, opening rate regulating means for adjusting an opening rate of the opening of the casing, and an outlet path having a second outlet formed at a center of a side wall of the casing at a side away from the top. In the method, the opening rate of the opening of the casing is adjusted by the opening rate regulating means according to the foreign materials contained in the raw material.

Also, in a method of removing foreign materials by a swirl type foreign material removing machine, the swirl type foreign material removing machine is formed of a cylindrical casing having a first outlet at a top or one end thereof, a raw material supply path formed at a side opposite to the top to be tangentially connected to the casing for supplying a raw material transferred by a pump to the casing through an opening of the casing, opening rate regulating means for adjusting an opening rate of the opening of the casing, and an outlet path having a second outlet formed at a center of a side wall of the casing at a side away from the top. In the method, the opening rate of the opening of the casing is adjusted by the opening rate regulating means according to the foreign materials contained in the raw material.

In the present invention, the opening rate of the opening of the casing is adjusted by the opening rate regulating means. Thus, with reference to the separating condition of the foreign materials at the first or second outlet, the opening rate of the opening can be properly adjusted by the opening rate regulating means.

DETAILED DESCRIPTION OF PREFERRED EMBODIMENTS

Figure 1:
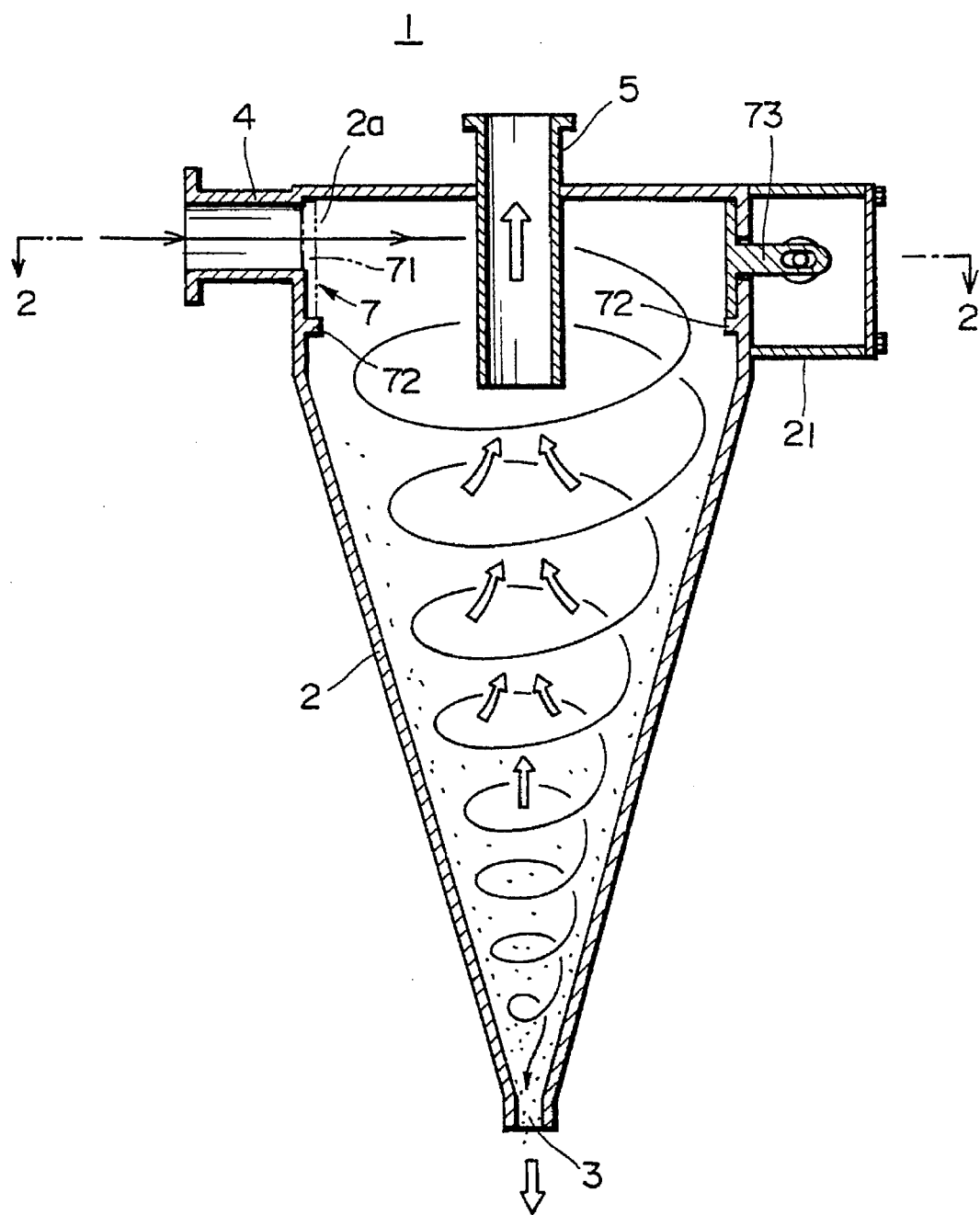
FIG. 1 is a section view of a first embodiment of a swirl type foreign material removing machine.

The embodiments of the invention are explained with reference to the accompanied drawings. FIGS. 1–4 show a swirl type foreign material removing machine 1 for removing foreign materials, such as sand, metal, wood chips and so on, from a stock or paper raw material by utilizing a centrifugal force and liquid shearing force. The removing machine 1 has a casing 2 in a reversed cone shape, which is tapered downwardly and has an outlet 3 at the apex thereof.

At a side away from the apex of the casing 2, a raw material supply path 4 is tangentially connected. The supply path 4 supplies a raw material transferred from a pump (not shown) to an inside of the casing 2 through an opening 2a of the casing 2. Also, an outlet path 5 having a second outlet is formed in the center of a side wall of the casing away from the apex of the casing.

At the opening 2a of the casing 2 communicating the supply path 4, an opening rate regulating device 7 is fixed to adjust an opening rate of the opening 2a.

Figure 2:
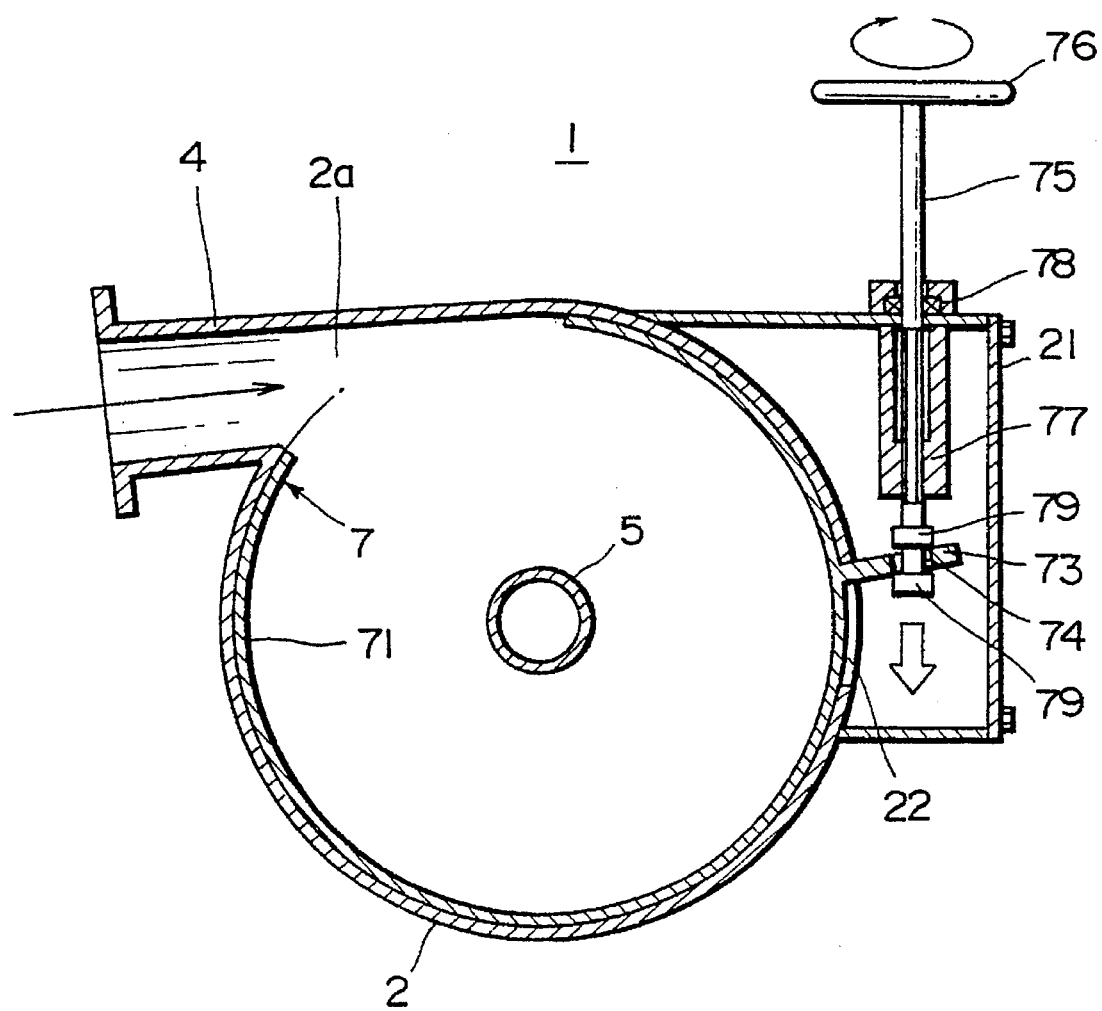
FIG. 2 is a section view taken along a line 2—2 in FIG. 1.
Figure 3:
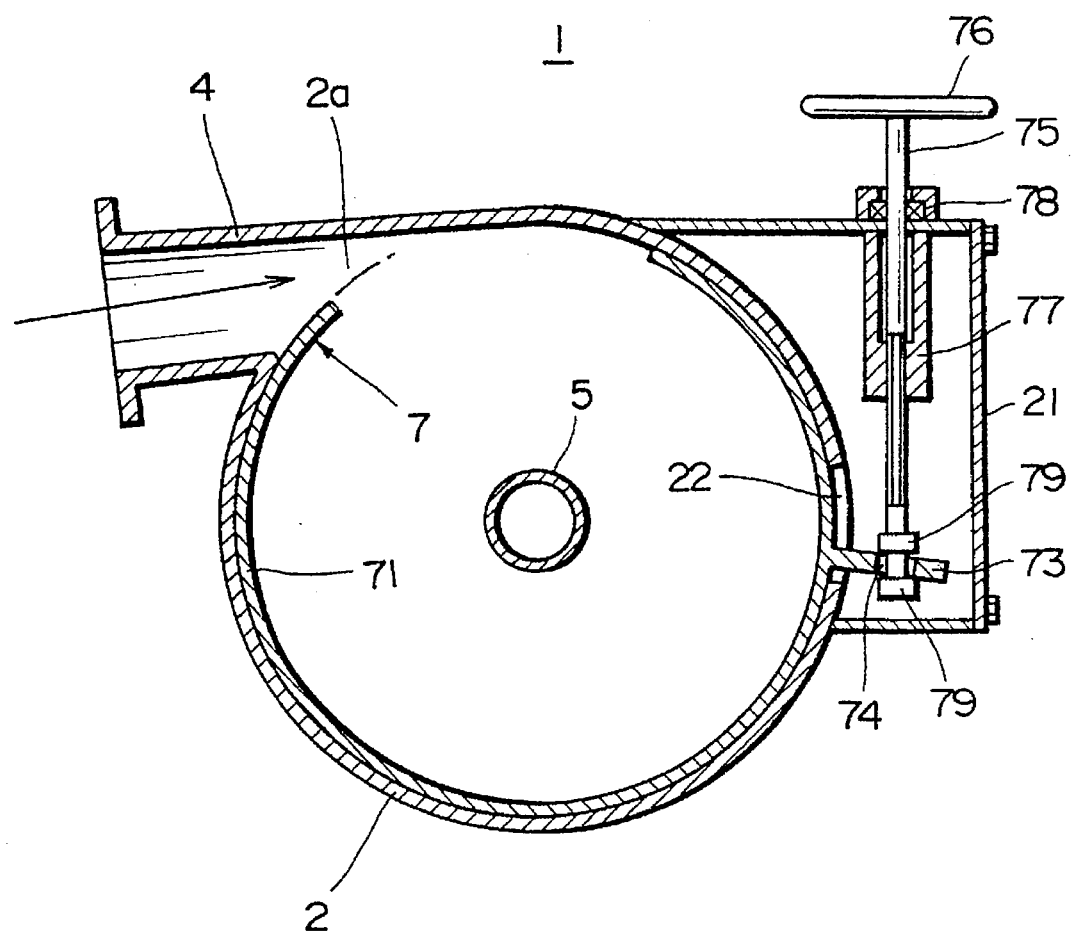
FIG. 3 is a section view for showing an operating condition of a cover portion.
Figure 4:
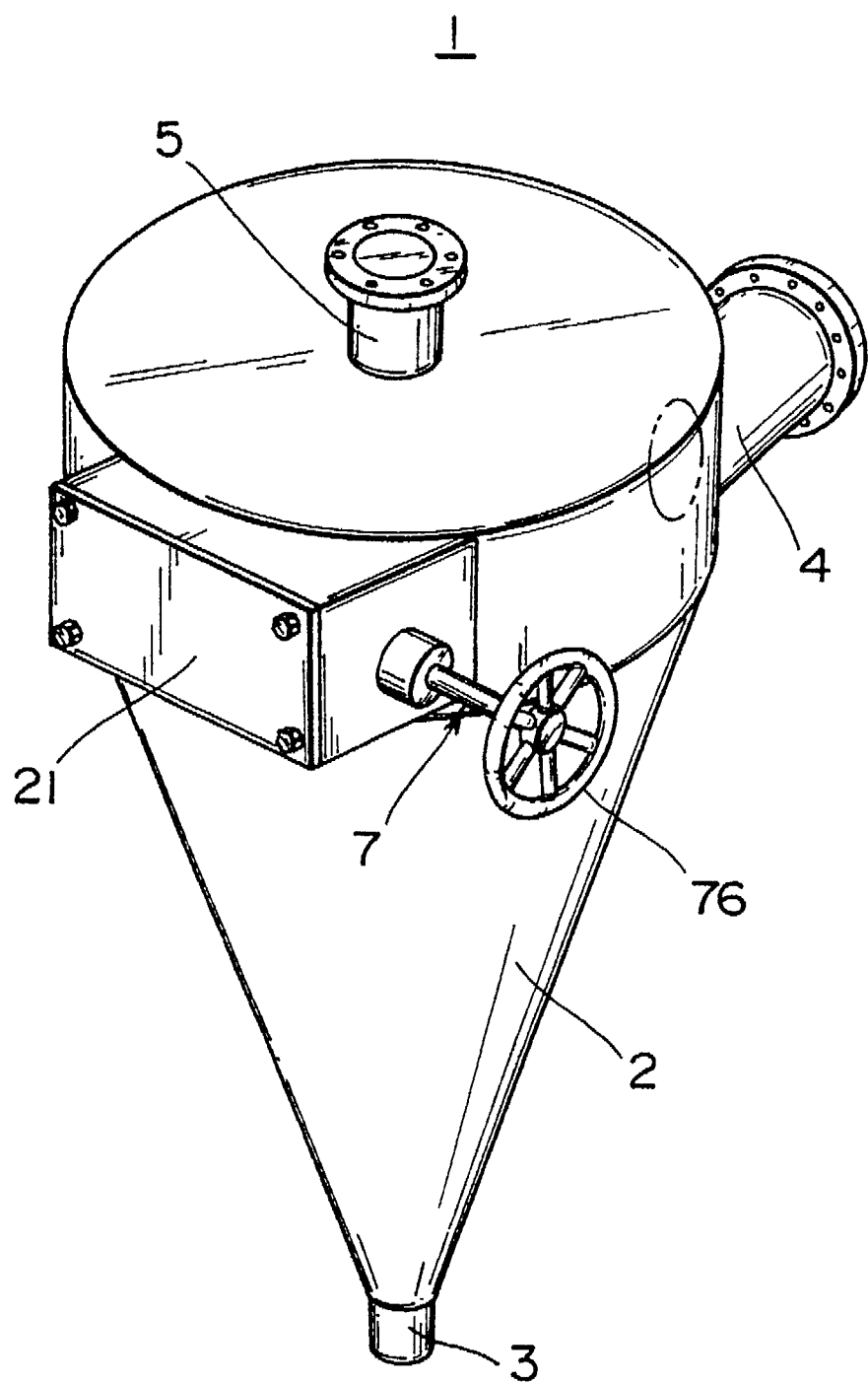
FIG. 4 is a perspective view of the swirl type foreign material removing machine as shown in FIG. 1.

As shown in FIGS. 2 and 3, the opening rate regulating device 7 regulates movement of a cover 71 to enter into the opening 2a, and increases or decreases an area of the opening 2a. The cover 71 is slidably situated at an inner surface of the casing 2. The casing 2 includes a flange 72 protruding inwardly from an inner surface thereof to allow the cover 71 to slide along the inner surface (FIG. 1).

Also, an enlarged portion 21 is partially formed at an upper side portion of the casing 2. In order to face the enlarged portion 21, an opening 22 for a lever 73 is formed in an inner wall of the casing 2. The lever 73 passes through the opening 22 and is fixed to the cover 71. The lever 73 also has an opening 74 for a lever operation member 75, and the lever operation member 75 is connected to the lever 73 through the opening 74 with play. The cover 71 is actuated by the lever operation member 75.

An end of the lever operation member 75 is connected to a handle 76 rotated by hands. Also, in a middle of the lever operation member 75, male threads are formed, and a female thread member 77 having female threads engaging the male threads is formed inside the enlarged portion 21. A sealing member 78 is attached to seal the casing 2.

Holding members 79 operate to prevent the lever operation member 75 from disengaging from the opening 74 of the lever 73. The holding members 79 keep the play condition between the lever 73 and the lever operation member 75.

When the raw material transferred from the pump (not shown) is supplied to the casing 2 through the supply path 4, swirl flow is formed inside the casing 2. Namely, the swirl flow is formed in the casing by strongly ejecting the raw material from the inlet opening 2a tangentially to the casing. By the centrifugal force and shearing operation by the difference between laminar flows in the swirl flow, the foreign materials in the raw material gradually move outwardly of the swirl flow and are lead downwardly of the casing 2, so that the foreign materials are ejected through the first outlet 3. Also, the raw material from which the foreign materials are removed is ejected through the outlet 5 and is lead to other sections.

While watching the separating condition of the foreign materials from the first outlet or the second outlet, the opening rate adjusting device 7 is adjusted by turning the handle portion 76 in the clockwise or counterclockwise direction. As a result, the opening rate of the opening 2a relative to the casing 2 is enlarged or reduced to thereby properly remove the various kinds of foreign materials.

It is not theoretically recognized whether the opening rate of the opening 2a relative to the casing 2 is enlarged or reduced in what kinds of the foreign materials exist in the raw material. However, the foreign materials contained in the stock or paper raw material include materials having heavy specific gravity, such as sand, metal and so on, and materials having light specific gravity, such as wood chips and so on. Also, even if materials have the same specific gravity, the materials may have different shapes. Further, rate of the foreign materials contained in the raw material is different. Thus, the best open rate of the opening 2a is determined based on the various factors. Therefore, practically, while watching the separating condition of the foreign materials from the first or second outlet, the opening rate adjusting device 7 is adjusted by turning the handle portion 76 in the clockwise or counterclockwise direction. As a result, the opening rate of the opening 2a relative to the casing 2 is enlarged or reduced to set the best position, so that the various foreign materials are properly handled or removed.

Also, in the conventional swirl type foreign material removing machine, pressure difference between the inlet path and the outlet path for the refined paper material is regulated to be constant by opening and closing an inlet valve formed in a middle of the inlet path. The inlet valve is located away from the opening of the inlet path for the reversed cone shape casing. Thus, the ejecting energy from the opening is consumed by pressure loss and so on from the inlet valve to the opening of the casing, and the formation of swirl flow in the casing is not effectively made. Therefore, the pump requires large power.

In view of the experiments by the inventor, it requires pressure difference of 1.5 kg/cm$^2$ in the conventional machine to properly remove the foreign materials. However, in order to obtain the same effects as in the conventional machine, it requires the pressure difference of 0.5 kg/cm$^2$ in the machine of the present invention.

In the swirl type foreign material removing machine and the method thereof, while watching the separating condition of the foreign materials in the first outlet or the second outlet, the opening rate of the opening 2a relative to the casing 2 is adjusted by the opening rate regulating device 7. Therefore, it is possible to set the best value for various kinds of foreign materials. Also, the ejecting energy from the opening is not wasted by the pressure loss from the inlet valve to the opening of the casing as in the conventional machine. Efficiency of the power of the pump is improved.

Figure 5:
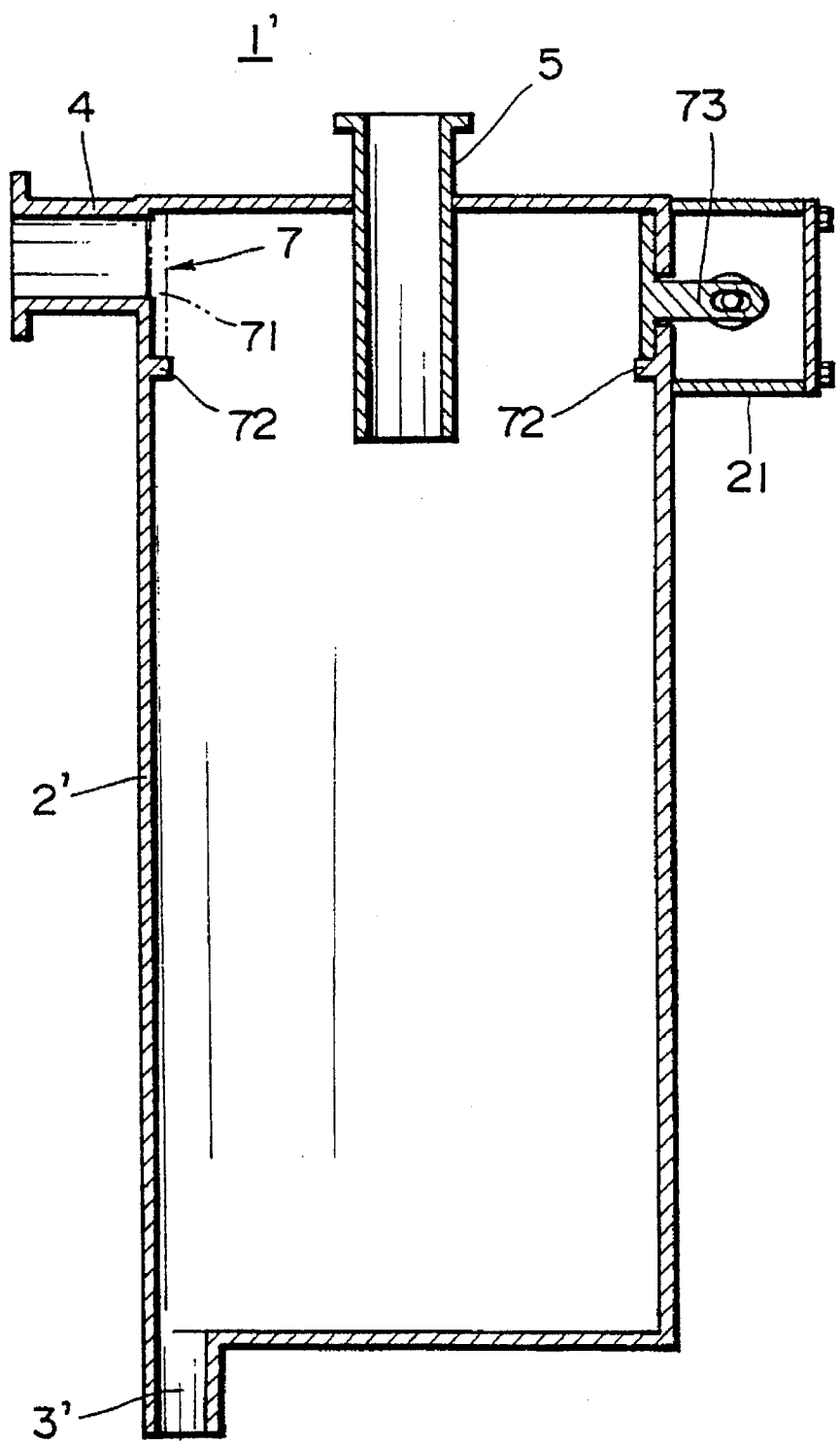
FIG. 5 is a section view of a second embodiment of a swirl type foreign material removing machine.

In the above example, the casing 2 has a reversed cone shape, but the present invention is not limited in this shape. As shown in FIG. 5, the swirl type foreign material removing machine 1' may have a cylindrical casing 2', wherein while watching the separating condition of the foreign materials in the first outlet or the second outlet, the opening rate of the opening relative to the casing 2' can be adjusted by the opening rate regulating device 7. Thus, it is possible to set the best value for various kinds of foreign materials. Also, the ejecting energy from the opening is not wasted, as in the conventional machine, by the pressure loss from the inlet valve to the opening of the casing, and efficiency of power of the pump is improved.

Namely, the swirl type foreign material removing machine 1' is formed of a cylindrical casing 2' having a first outlet 3' at a periphery of the bottom of the casing, a raw material supply path 4 tangentially connected to the casing 2' at a side away from the bottom of the casing 2' and supplying a raw material transferred from a pump (not shown) to the casing 2' through an opening of the casing 2', an open rate regulating device 7 for adjusting an open rate of the opening of the casing 2', and an outlet path 5 having a second outlet situated in the center of a side wall of the casing 2' located at a side opposite to the bottom of the casing.

The machine 1' is the same as the machine 1 except for the shape of the casing 2' and the location of the first outlet 3'. Therefore, the same members as shown in FIGS. 1–4 have the same numerals, and the explanation thereof is omitted.

Figure 6:
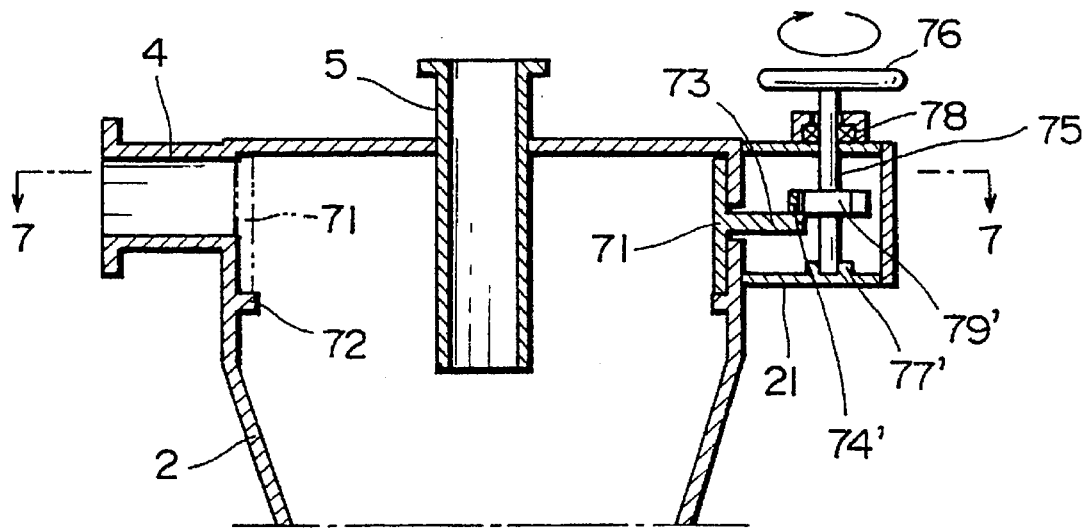
FIG. 6 is a section view of a modified first embodiment for showing a lever and a lever operating portion.
Figure 7:
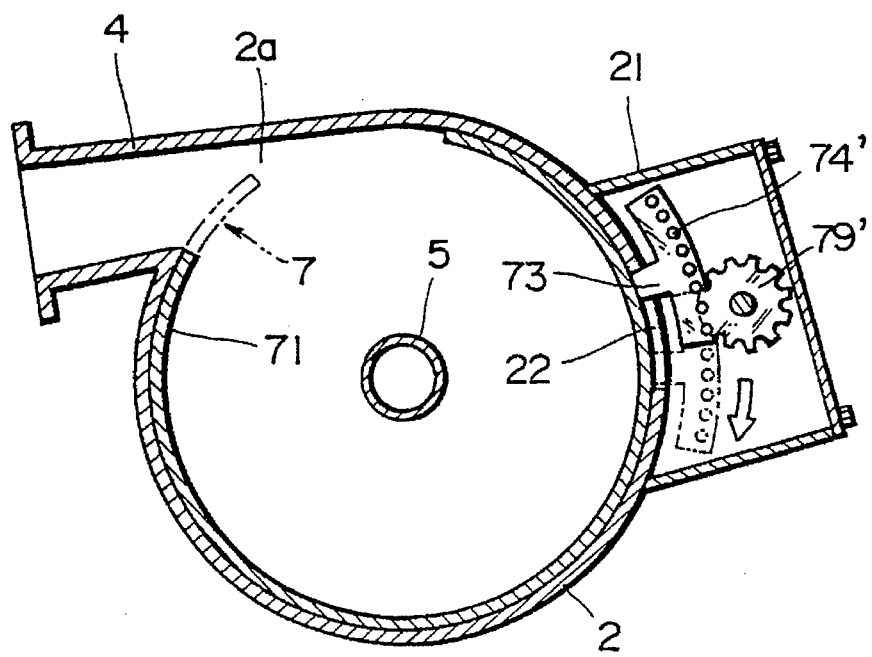
FIG. 7 is a section view taken along a line 7—7 in FIG. 6.

Also, in the embodiments as shown in FIGS. 1 and 5, the lever operation member 75 is engaged with play with the lever 73 while passing through the opening 74 of the lever 73. However, as shown in FIGS. 6 and 7, the lever 73 may have a plurality of projections 74', and gears 79' engaging the projections 74' may be formed in the lever operation member 75. One end of the lever operation member 75 is rotationally supported by a supporting member 77'. When the handle 76 is rotated, the open rate of the opening 2a relative to the casing 2 can be adjusted.

In the swirl type foreign material removing machine and the method thereof according to the present invention, while watching the separating condition of the foreign materials in the first outlet or the second outlet, the opening rate of the opening relative to the casing is adjusted by the opening rate regulating device. Therefore, the opening rate of the opening can be set best for various kinds of foreign materials. Also, the ejecting energy of the raw material from the opening is not wasted or consumed by the pressure loss from the inlet valve to the opening of the casing as in the conventional machine. Therefore, efficiency of the pump is improved.

While the invention has been explained with reference to the specific embodiments of the invention, the explanation is illustrative, and the invention is limited only by the appended claims.

What is claimed is:

1. A swirl type foreign material removing machine for removing foreign materials from a raw material, comprising:

a casing having at least one end wall, a smooth side wall connected to the end wall and extending in a direction away from the end wall, a first outlet formed at a side away from the end wall, an inlet formed in the side wall at a side away from the first outlet, an elongated opening near the inlet, and a second outlet formed in a center of the end wall, a raw material supply path tangentially connected to the casing through the inlet, said raw material being ejected tangentially to the side wall of the casing through the raw material supply path and the inlet to smoothly form swirl flow of the raw material in the casing, and means for adjusting an opening rate of the inlet formed in the side wall of the casing for adjusting an amount of the raw material ejected into the casing, said adjusting means including an elongated cover curved along and situated inside the smooth side wall of the casing near the inlet, a lever operation member connected to the elongated cover and extending outwardly through the elongated opening of the casing, and operation means situated outside the casing and connected to the lever operation member so that when the operation means is actuated, the elongated cover is moved inside the casing to adjust the opening rate of the inlet to thereby remove the foreign materials effectively from the first outlet and to recover a refined raw material through the second outlet.

2. A swirl type foreign material removing machine according to claim 1, wherein said second outlet projects from the end wall into an inside of the casing to receive the refined raw material therethrough.

3. A swirl type foreign material removing machine according to claim 2, wherein said casing has a reversed cone shape, said first outlet being located at an apex of the cone shape.

4. A swirl type foreign material removing machine according to claim 2, wherein said casing has a cylindrical shape, and a second end wall opposite to the end wall with the second outlet, said first outlet being located at the second end wall near the side wall.

5. A swirl type foreign material removing machine according to claim 1, wherein said casing has a cylindrical portion adjacent to the end wall, said inlet and elongated opening being located in the cylindrical portion, said inlet having a tangential side at which a part of the raw material supply path extends tangentially to an inner surface of the cylindrical portion and a non-tangential side opposite to the tangential side, said elongated cover being located at the non-tangential side of the cylindrical portion to extend into the inlet from the non-tangential side.

6. A swirl type foreign material removing machine according to claim 5, wherein said casing has a flange situated inside the cylindrical portion of the casing to support the elongated cover thereon.

7. A swirl type foreign material removing machine according to claim 6, wherein said elongated cover has a longitudinal length generally corresponding to a length of an inner periphery of the cylindrical portion except for the inlet.

8. A method of removing foreign materials from a raw material, comprising:

preparing a casing having at least one end wall, a smooth side wall connected to the end wall and extending in a direction away from the end wall, a first outlet formed at a side away from the end wall, an inlet formed in the side wall at a side away from the first outlet, and a second outlet formed in a center of the end wall; a raw material supply path tangentially connected to the casing through the inlet; and means for adjusting an opening rate of the inlet formed in the side wall including an elongated cover curved along and situated inside the smooth side wall of the casing near the inlet, a lever operation member connected to the elongated cover and extending outwardly through an elongated opening of the casing, and operation means situated outside the casing and connected to the lever operation member, ejecting the raw material to the casing tangentially through the raw material supply path and the inlet, and regulating said operation means of the adjusting means for adjusting an amount of the raw material ejected into the casing while watching separating condition of the foreign materials from the first outlet or the second outlet, said operation means moving the elongated cover to change the opening rate of the inlet so that the foreign materials are effectively removed from the first outlet.

9. A method according to claim 8, wherein said casing has a revered cone shape, said raw material spirally flowing in the casing from the inlet, said foreign material being ejected from the first outlet and refined raw material being ejected from the second outlet.

10. A method according to claim 8, wherein said casing has a cylindrical shape, said foreign material being ejected from the first outlet and refined raw material being ejected from the second outlet.

11. A method according to claim 8, wherein said inlet has a tangential side at which a part of the raw material supply path extends tangentially to an inner surface of the casing and a non-tangential side opposite to the tangential side, said elongated cover being located at the non-tangential side of the casing to extend into the inlet from the non-tangential side when the operation means is actuated.

* * * * *